H. BRIGGS.
MOLDING CONCRETE BLOCKS.
APPLICATION FILED JAN. 22, 1908.
916,260. Patented Mar. 23, 1909.
4 SHEETS—SHEET 1.
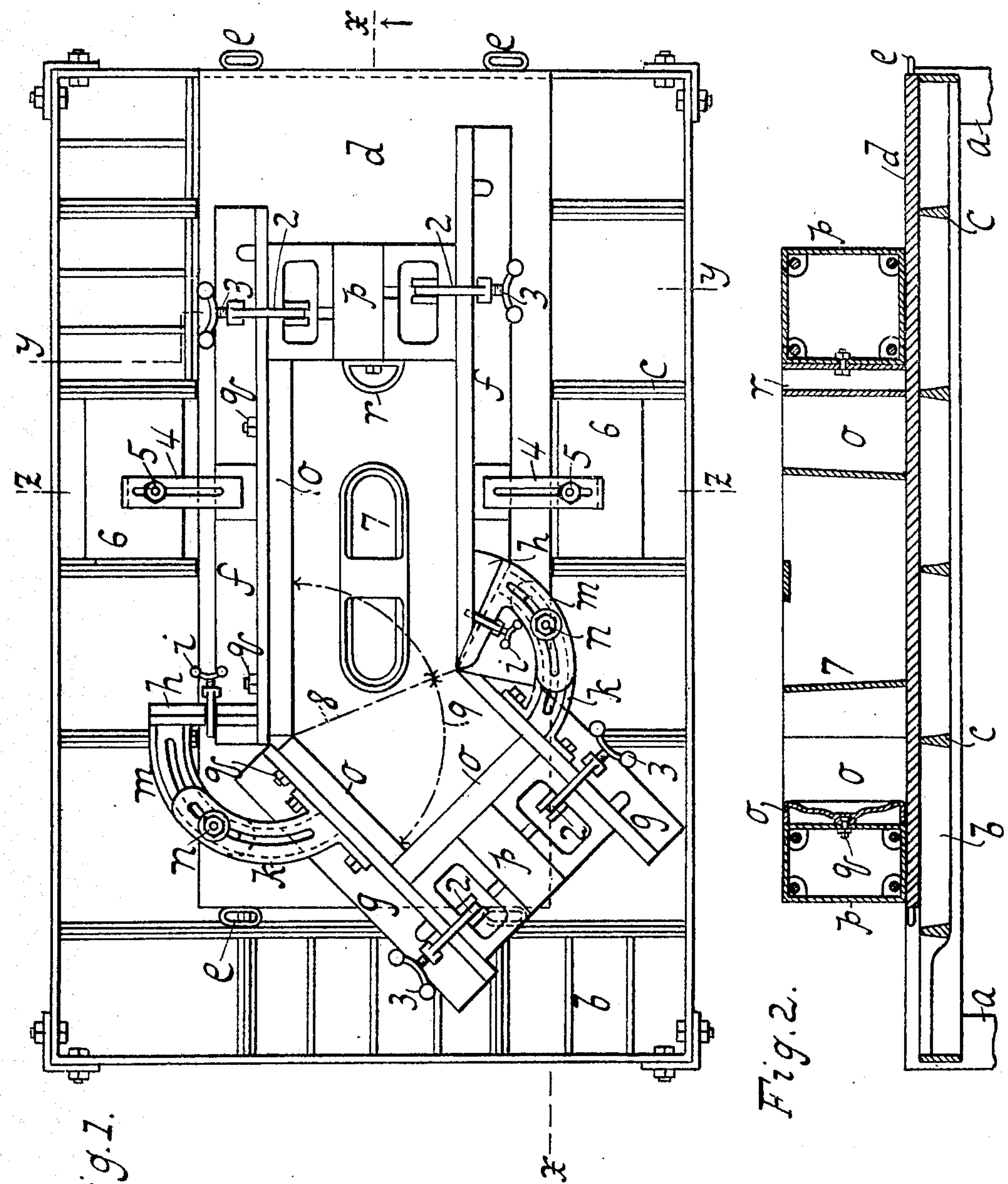
WITNESSES:
William Miller
Edward Viesner
INVENTOR
Henry Briggs
BY
W. C. Hauff
ATTORNEY
THE NORRIS PETERS CO., WASHINGTON, D. C.

H. BRIGGS.
MOLDING CONCRETE BLOCKS.
APPLICATION FILED JAN. 22, 1908.
916,260. Patented Mar. 23, 1909.
4 SHEETS—SHEET 2.
Fig. 3.
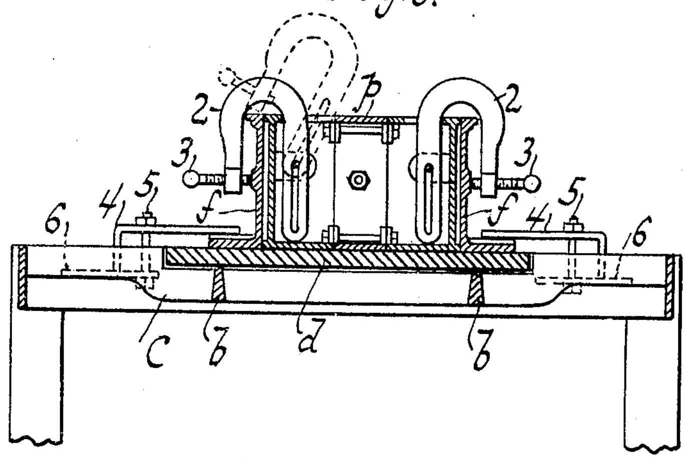
Fig. 4.
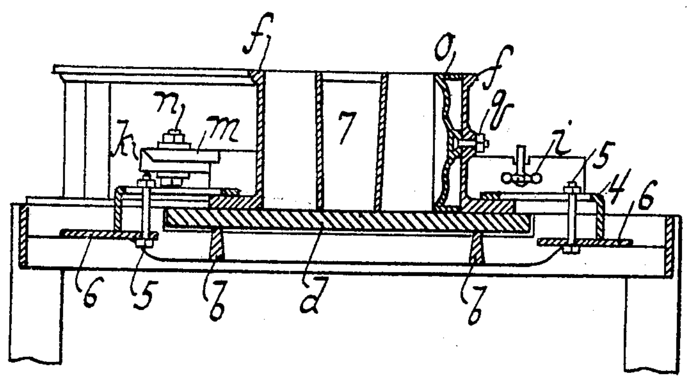
Fig. 5.
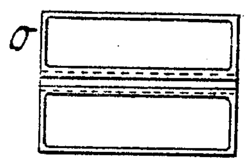
Fig. 6.
o
WITNESSES:
William Miller
Edward Wiener
INVENTOR
Henry Briggs
BY
W. C. Hauff
ATTORNEY
THE NORRIS PETERS CO., WASHINGTON, D. C.

H. BRIGGS.
MOLDING CONCRETE BLOCKS.
APPLICATION FILED JAN. 22, 1908.
916,260. Patented Mar. 23, 1909.
4 SHEETS—SHEET 3.
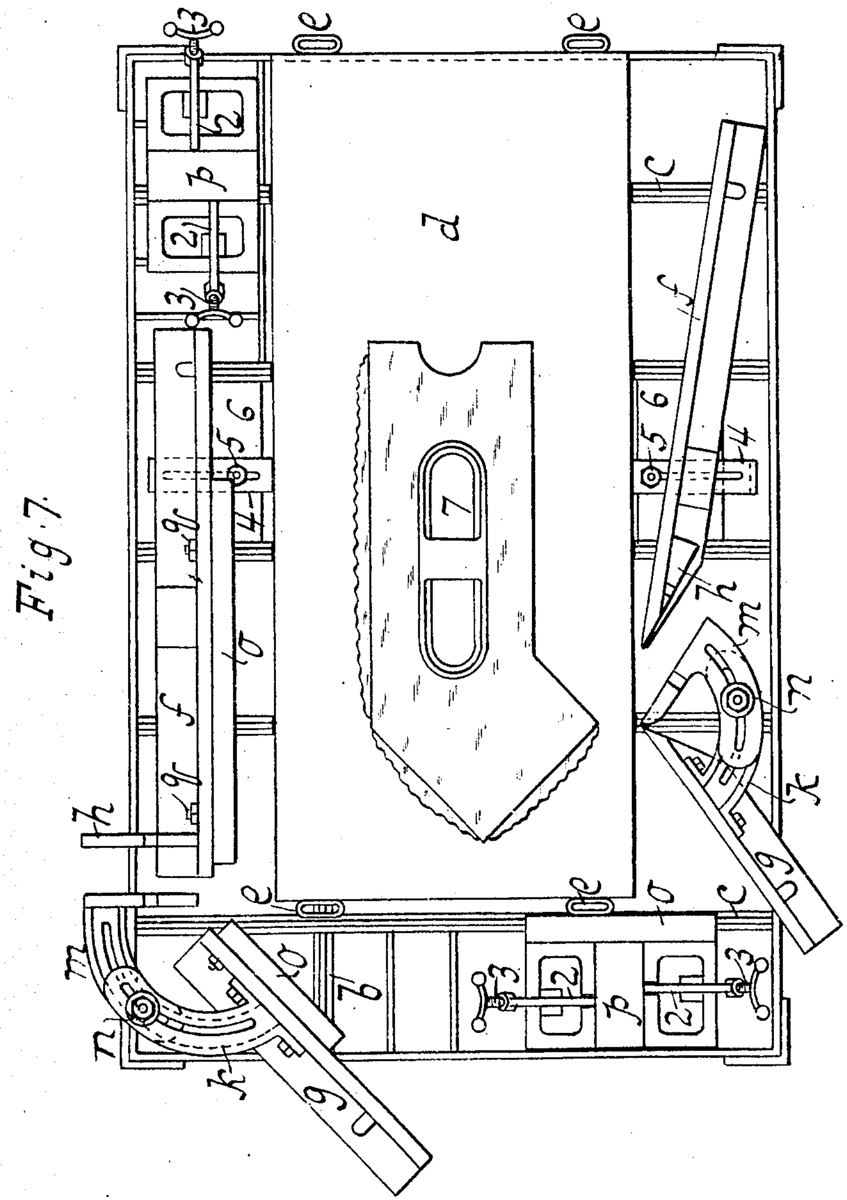
WITNESSES:
William Miller
Edward Wiener
INVENTOR
Henry Briggs
BY W. C. Hauff
ATTORNEY H. BRIGGS.
MOLDING CONCRETE BLOCKS.
APPLICATION FILED JAN. 22, 1908.
916,260.
Patented Mar. 23, 1909.
4 SHEETS—SHEET 4.
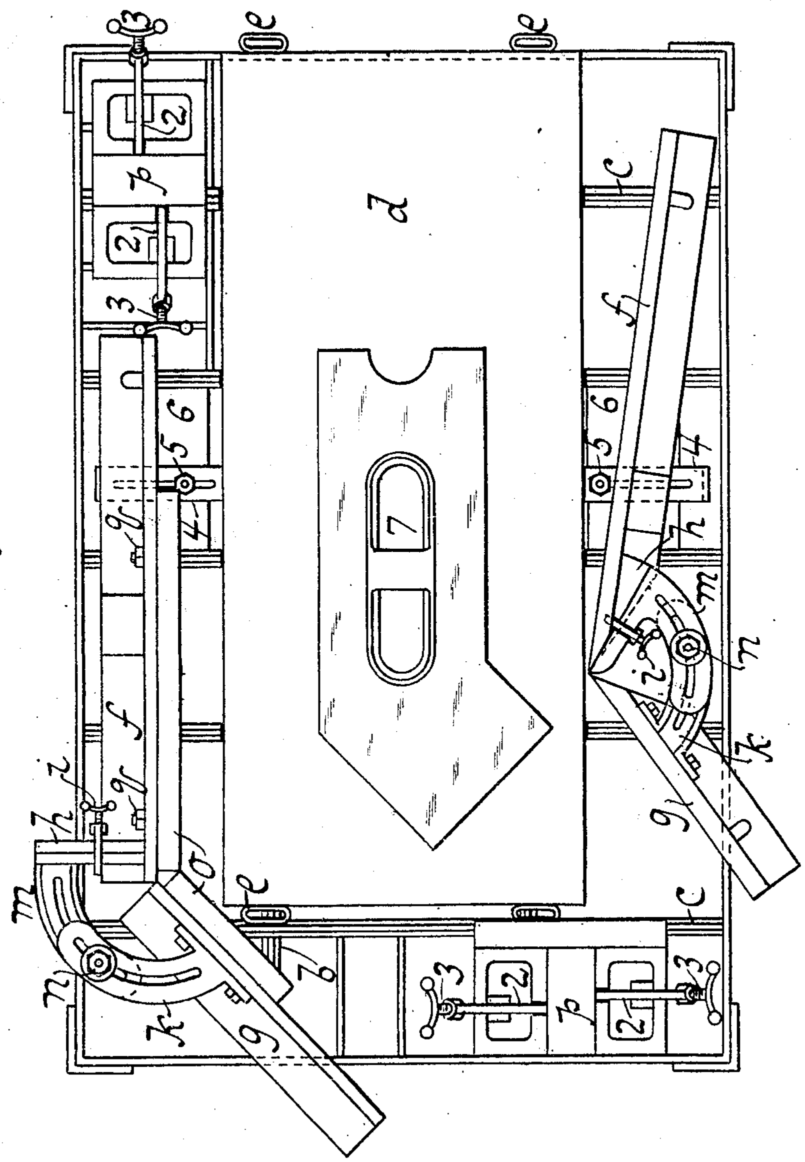
WITNESSES:
*William Miller*
*Edward Kiener*
INVENTOR
*Henry Briggs*
BY *W. C. Hauff*
ATTORNEY
THE NORRIS PETERS CO., WASHINGTON, D. C.

UNITED STATES PATENT OFFICE.

HENRY BRIGGS, OF HASBROUCK HEIGHTS, NEW JERSEY.

MOLDING CONCRETE BLOCKS.

No. 916,260. Specification of Letters Patent. Patented March 23, 1909.

Application filed January 22, 1908. Serial No. 412,172.

*To all whom it may concern:*

Be it known that I, HENRY BRIGGS, a citizen of the United States, residing at Hasbrouck Heights, in the county of Hackensack and State of New Jersey, have invented new and useful Improvements in Molding Concrete Blocks, of which the following is a specification.

By means of this invention a mold can be set for forming a number of blocks or the like with accurate uniformity or correspondence. Such blocks can be either parallel sided or so called angle blocks of any desired angular degree. Such mold can then be removed from the contained block in sections or so as not to affect or deface any part of the block and such sections then reunited for further operation while continually maintaining the original angularity without resetting or readjustment being required.

The device also enables a brick or block to be readily set aside to dry or harden while the device is kept in use for forming subsequent blocks.

The device can also serve for forming blocks of various sizes and varying ornamentations from plane to different designs as well as different angularity.

This invention is set forth in the following specification and claims and illustrated in the annexed drawing in which—

Figure 1 shows a plan view of a molding device embodying this invention. Fig. 2 is a section along line X X Fig. 1 Fig. 3 is a section along line Y Y Fig. 1 Fig. 4 is a section along line Z Z Fig. 1 Fig. 5 shows a detail view of a face-plate Fig. 6 is an edge view of Fig. 5 Fig. 7 is a view like Fig. 1 the mold parts being dismembered or separated. Fig. 8 shows parts of Fig. 7 when kept united as for a plane faced block.

In this drawing is shown a table or support with legs *a* and longitudinal and transverse beams *b* and *c* so as to form a table of skeleton shape. Onto this table is placed a pallet or flat base piece *d* with handles *e* at suitable points. On this pallet is shown a mold comprising side walls each made in sections *f* and *g*. Each side wall can have its sections separably united by means of connecting members *h* adapted for the application of bolts or fastenings *i*. The wall section *g* is connected to its member *h* by arc sections *k* *m* which can be set to a desired angle and then fixed by a clamp or a screw *n*. The connecting member *h* of section *f* is fixed thereto.

When the clamping arc has been fixed by its screw *n* to a desired angle the sections *f g* or their connections *h* can then be assembled and separated at will but the angle to which the arc has been fixed can at all times be maintained. As the resetting to a selected arc or angle when once disturbed is difficult the maintaining of such angle between sections *f* and *g* in spite of connection and disconnection is an advantage.

By enabling wall sections *f g* to be set to line with one another or to any selected angle, blocks of various kinds can be produced in the mold such as square cornered or angular. Face pieces *o* are shown at the sections *f g* of a side wall and a like face piece *o* can also be supplied to an end piece *p* to be presently referred to. These face pieces may have various designs or facings according to the decoration to be produced on the block or building stone to be formed in the mold.

The face pieces can be secured in place by bolts *q* in the side walls and end pieces, said face pieces having dove tailed or undercut grooves for engaging the bolt heads and allowing the face pieces to be slipped or slid to place before being clamped or bolted.

In addition to the end piece *p* carrying a face piece *o* there is shown another end piece *p* having a core piece *r* screwed thereto or which can be connected the same as face piece *o*. These end pieces can be composed of several sections bolted together so that they can be fitted for various desired widths. The end pieces can be connected to the sides by clamps composed of hook shaped pieces 2 slidably connected by slot and pin connection to the end pieces. Such a clamp or hook piece can be lifted to be passed over a side piece as shown by dotted lines in Fig. 3 and then slipped down so as to hook over the side and fastened by screw 3. When disconnected the end pieces can be laid aside for future use.

The mold is assembled as follows: The side pieces *f g* are set to proper angle and connected to one another by end pieces *p* and placed on pallet *d* where they are clamped by clamp pieces 4 shown of L shape and bolted at 5 to bottom plates 6. The horizontal branches of clamps 4 are slitted so that when bolts 5 are loosened the clamps can be slid to or from the pieces *f g* to engage or release their lower or flanged portions. The side pieces having the faces $o$ connected thereto are then screwed to the pallet the end pieces having been screwed between the sides. Into this closed mold is then placed a core piece 7 and the plastic mass tamped or poured into the mold. When suitably set the side pieces are disconnected at $h$ and the end pieces freed at 2 and the clamps 4 also freed. Piece or member $f$ can then be pulled away from the block at right angle to its corresponding block face, and members $g$ and $o$ as also member $p$ can each be likewise moved away each at right angle to its corresponding block portion. By thus severally removing the respective side, end and face pieces each in square or rectangular direction all skew or scraping of a face piece over a block face is avoided which especially in case of a roughened or ornamented face would be objectionable.

The core piece 7 can be employed to give the usual hollow in such blocks. At a suitable time the various parts are unclamped or separated. The skeleton top allows the table to be kept clear of any scrap or refuse.

When unclamped the pallet is removed with the formed or molded block to be allowed to set and by inserting another pallet on the table the operation can be repeated and continued.

The end pieces have all their four angles each formed as a right angle and these end pieces are of such width as to accurately seat the side wall sections when the end pieces and side sections are clamped solidly or closely together. By this means each end piece forms an angle of ninety degrees with each adjacent side section. When such end pieces are clamped accurately against the side sections of one side, then the opposite side sections as they are moved to sit accurately or squarely to the end pieces will be brought thereby to position to preserve the angle of the arc.

By having not only the blocks of uniform angularity with one another or the arc preserved, but by also having each angle in each block uniform with the opposite angle in the same block, these blocks by being laid up reversed as is done in building to break joints, will preserve the exterior and interior angles in a right or true vertical line.

As seen in dotted lines in Fig. 1 if an arc is drawn about an angle of the block from a side section of one side to the side section of the other side then a line across the block from angle to angle will bisect such arc or divide the arc into two equal halves. In other words the line 8 will halve the arc 9.

I claim—

1. In a molding device, sectional side walls adapted to be fixed at various degrees of angularity, and end sections combined with bow shaped clamps for detachably uniting end and side sections, said clamps being connected at one shank to a section by a pin and slot connection and having a clamping screw at the other shank for engaging an opposite section.

2. In a molding device, side walls each composed of sections with connecting and adjusting means for maintaining a selected angle while connecting and separating the sections, frame shaped end pieces and hook shaped clamps having one branch extended into and slidably connected to the end pieces and having the opposite branches provided with screws for engaging the side walls.

3. In a molding device side walls each made in sections adjustable with relation to one another, combined with rectangular parallel sided and frame shaped end pieces having clamps at each extremity to engage opposite side sections, said end pieces adapted to bring the side sections into right angle with the end pieces when clamped thereto so that when the end pieces have been clamped to the sections of one side, the side sections at the other side as they are clamped to the end pieces will be secured in position to have the arc of the angle preserved.

In testimony whereof I have hereunto set my hand in the presence of two subscribing witnesses.

HENRY BRIGGS.

Witnesses:
JENNIE WERSTEIN,
WILLIAM MILLER.